(12) United States Patent
Azima

(10) Patent No.: US 6,676,879 B1
(45) Date of Patent: Jan. 13, 2004

(54) METHOD OF MAKING VEHICLE INTERIOR TRIM PANEL WITH INTEGRAL LOUDSPEAKER

(75) Inventor: Henry Azima, Cambridge (GB)

(73) Assignee: New Transducers Limited, London (GB)

( * ) Notice: Subject to any disclaimer, the term of this patent is extended or adjusted under 35 U.S.C. 154(b) by 0 days.

(21) Appl. No.: 09/494,304

(22) Filed: Jan. 31, 2000

Related U.S. Application Data

(60) Provisional application No. 60/150,599, filed on Aug. 26, 1999.

(30) Foreign Application Priority Data

Jan. 29, 1999 (GB) .............................................. 9901895

(51) Int. Cl.$^7$ ............................. B29C 43/02; H04R 7/06
(52) U.S. Cl. ...................... 264/409; 264/40.1; 264/319; 381/86
(58) Field of Search ................................ 264/406, 409, 264/40.1, 250, 319, 320; 381/86, 386; 181/148, 171, 173

(56) References Cited

U.S. PATENT DOCUMENTS

| | | | |
|---|---|---|---|
| 4,410,064 A | * | 10/1983 | Taddeo |
| 4,657,108 A | * | 4/1987 | Ward |
| 5,693,916 A | * | 12/1997 | Von Sprecken |
| 6,427,016 B1 | * | 7/2002 | Azima et al. |

FOREIGN PATENT DOCUMENTS

| | | |
|---|---|---|
| WO | WO 97/09842 | 3/1997 |
| WO | WO 97/17818 | 5/1997 |
| WO | WO 98/42536 | 10/1998 |
| WO | WO 98/52381 | 11/1998 |

\* cited by examiner

Primary Examiner—Mathieu D. Vargot
(74) Attorney, Agent, or Firm—Foley & Lardner

(57) ABSTRACT

A method of making a vehicle interior trim panel having at least one integral resonant bending wave loudspeaker panel. The method involves designing the trim panel to comprise at least one panel area capable of and intended to operate as a resonant bending wave loudspeaker, making a prototype trim panel to the design, optimising at least one parameter of the prototype panel as concerns its behavior as a resonant bending wave loudspeaker by obtaining the standard deviation, as frequency is varied, of the mechanical impedance of the panel as a function of the at least one parameter, selecting a value or values of said at least one parameter that result in a minimum of said standard deviation of the mechanical impedance of the panel, and making a trim panel in which the at least one parameter to be optimized has the selected value or values.

15 Claims, 3 Drawing Sheets

METHOD OF MAKING VEHICLE INTERIOR TRIM PANEL WITH INTEGRAL LOUDSPEAKER

This application claims the benefit of provisional application No. 60/150,599, filed Aug. 26, 1999.

TECHNICAL FIELD

The invention relates to loudspeakers and more particularly to resonant panel-form loudspeakers, e.g. of the general kind described in U.S. application Ser. No. 08/707,012, filed Sep. 3, 1996, and known as "distributed mode" or "DM" loudspeakers, installed in vehicles such as automobiles, railway carriages, aeroplanes, omnibuses and the like.

BACKGROUND ART

At present vehicle trim is designed and manufactured solely for the purpose of interior fitting, decoration, sound insulation etc. and is also connected to and may form the support for accessories such as arm rests, cup holders, control buttons, grab handles, levers, knobs and the like. As such the usual constraints of moderate cost and relative unimportance of weight have led to a vehicle trim panel type which is often of high mechanical impedance (Zm) and high mass per unit area (u).

It is however known from WO97/09842 to provide a distributed mode loudspeaker which is integral with a vehicle interior trim panel component.

DISCLOSURE OF THE INVENTION

An object of the present invention is to provide a class of resonant panel-form loudspeaker integrated with other panel form structures forming the interior trim in a vehicle, e.g. an automobile, railway carriage, aeroplane, omnibus or the like whereby the integrated structure is configured to fulfil the joint requirements for vehicle trim use and as a loudspeaker.

According to the invention, there is provided a method of making a vehicle interior trim panel having at least one integral resonant bending wave loudspeaker panel, comprising designing the trim panel to comprise at least one panel area capable of and intended to operate as a resonant bending wave loudspeaker, making a prototype trim panel to the design, optimising at least one parameter of the prototype panel as concerns its behaviour as a resonant bending wave loudspeaker by obtaining the standard deviation, as frequency is varied, of the mechanical impedance of the panel as a function of the at least one parameter, selecting a value or values of said at least one parameter that result in a minimum of said standard deviation of the mechanical impedance of the panel, and making a trim panel in which the at least one parameter to be optimised has the selected value or values. The prototype panel may be further analysed by laser scanning and/or by proximate analysis of acoustic output over area.

The at least one panel area of the trim panel may be designed as a distributed mode loudspeaker e.g. as described in application Ser. No. 08/707,012, which is incorporated herein by reference in its entirety.

The at least one panel area of the trim panel may be designed to have an effective frequency distribution of at least the first few, e.g. say six, resonant modes of bending wave behaviour.

The method may comprise designing the at least one panel area so that resonant modes associated with one axis of the said at least one panel area are interleaved in frequency with resonant modes associated with another axis of the said at least one panel area.

The method may comprise designing the at least one panel area to comprise means defining a boundary of the said at least one panel area.

The trim panel may be made by moulding using heat and/or pressure.

From another aspect, the invention is a vehicle interior trim panel made by the method set out above.

It has been shown in DM art, e.g. application Ser. No. 08/707,012, that panels may be configured and designed to have useful regions of modal distribution for desirable sound radiation including specific recommended geometries or implied geometries. In addition panels may have useful DM operable regions developed by analytical methods so that useful acoustic output, which may augment the DM operable region, is obtainable from larger areas of the panel working below the modally dense frequency range and which may include useful contribution of sound from area drive in a substantially whole body diaphragm mode approximating the action of a drum. Through appropriate design and analysis the behaviour in this range may be tailored to provide a wider and more useful frequency range of sound than using DM alone. The larger driven area may thus provide a lower frequency support to the higher frequency and more critical DM region.

The method may comprise designing/specifying trim components of reduced mass and lower mechanical impedance for vehicles, which are properly adapted largely to maintain their original functionality but which additionally have region(s) and/or inbuilt area(s) of panel which are suited to bending wave speaker operation and where the operable sections are configured to have a useful distribution of modal resonances suitable for producing an effective sound output when vibrational energy is input to these areas/sections via a suitable electrodynamic exciter connected to an audio signal means. Moulding techniques involving heat and/or pressure may be employed to make these combination speaker/trim assemblies to provide a strong integrated assembly compatible with standard production techniques.

The trim speaker may have single or multiple exciters disposed for the desired coupling to the useful modal resonances.

The trim speaker may have a sub panel(s) moulded or co-moulded or otherwise integrally fixed into position on the trim panel. This sub panel may be seamless in appearance when viewed from the side accessible to the vehicle user. The sub panel(s) may be full range or optimised for specific ranges, e.g. the higher frequencies. In the latter case the acoustic damping and mechanical impedance may be optimised for improved high frequency modal resonant behaviour. The sub panel(s) may work in conjunction with the main panel and where the main panel may be optimised for the lower frequencies.

BRIEF DESCRIPTION OF THE DRAWING

The invention is diagrammatically illustrated, by way of example, in the accompanying drawing, in which.

DETAILED DESCRIPTION OF THE BEST MODE FOR CARRYING OUT THE INVENTION

Figure 1:
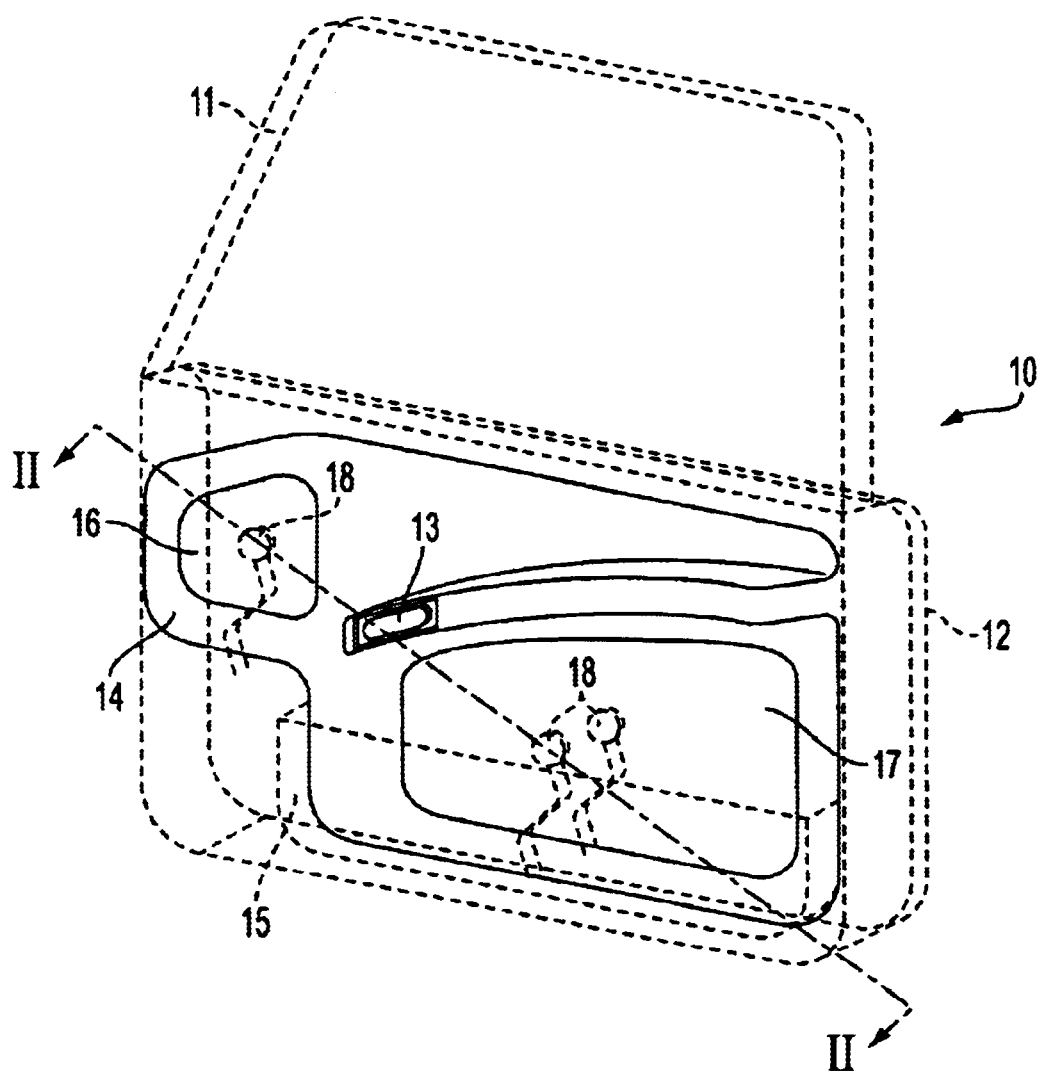
FIG. 1 is a perspective view of an automobile door showing an interior trim panel for the door.

In the drawing FIG. 1 shows in dotted lines the outline of an automobile door 10 having a window frame 11, an outer side 12 and an inner trim panel 14 which may serve the multiple functions of sound deadening, obscuring functional items mounted in the door such as a window raising and lowering mechanism, door operating mechanisms etc. (not shown) which provides a decorative finish to the interior of the vehicle and which carries various items of vehicle interior furniture such as a door handle 13, an arm rest (not shown) and a door pocket shown in dotted lines at 15 etc.

Figure 2:
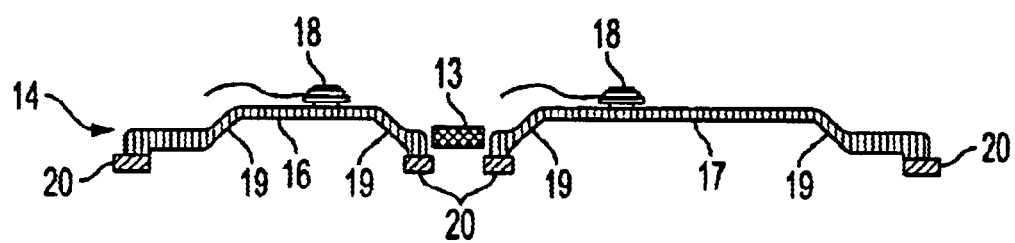
FIG. 2 is a cross-sectional view taken on the line II—II of FIG. 1 through the trim panel shown in FIG. 1.

As shown the trim panel 14 is formed with generally flat panel areas 16 and 17 respectively which form bending wave resonant panel loudspeakers, generally as taught in application Ser. No. 08/707,012. The smaller panel area 16 is driven by a single vibration exciter 18, and the larger panel area 17 is driven by a pair of vibration exciters 18. As shown in FIG. 2, the. flat panel areas 6, 17 are bounded by ridges 19 in the trim panel. The panel areas 16, 17 may be relatively thin compared to remaining areas of the panel, e.g. where the panel 14 is fixed to structure 20 forming part of the door 10.

Figure 3:
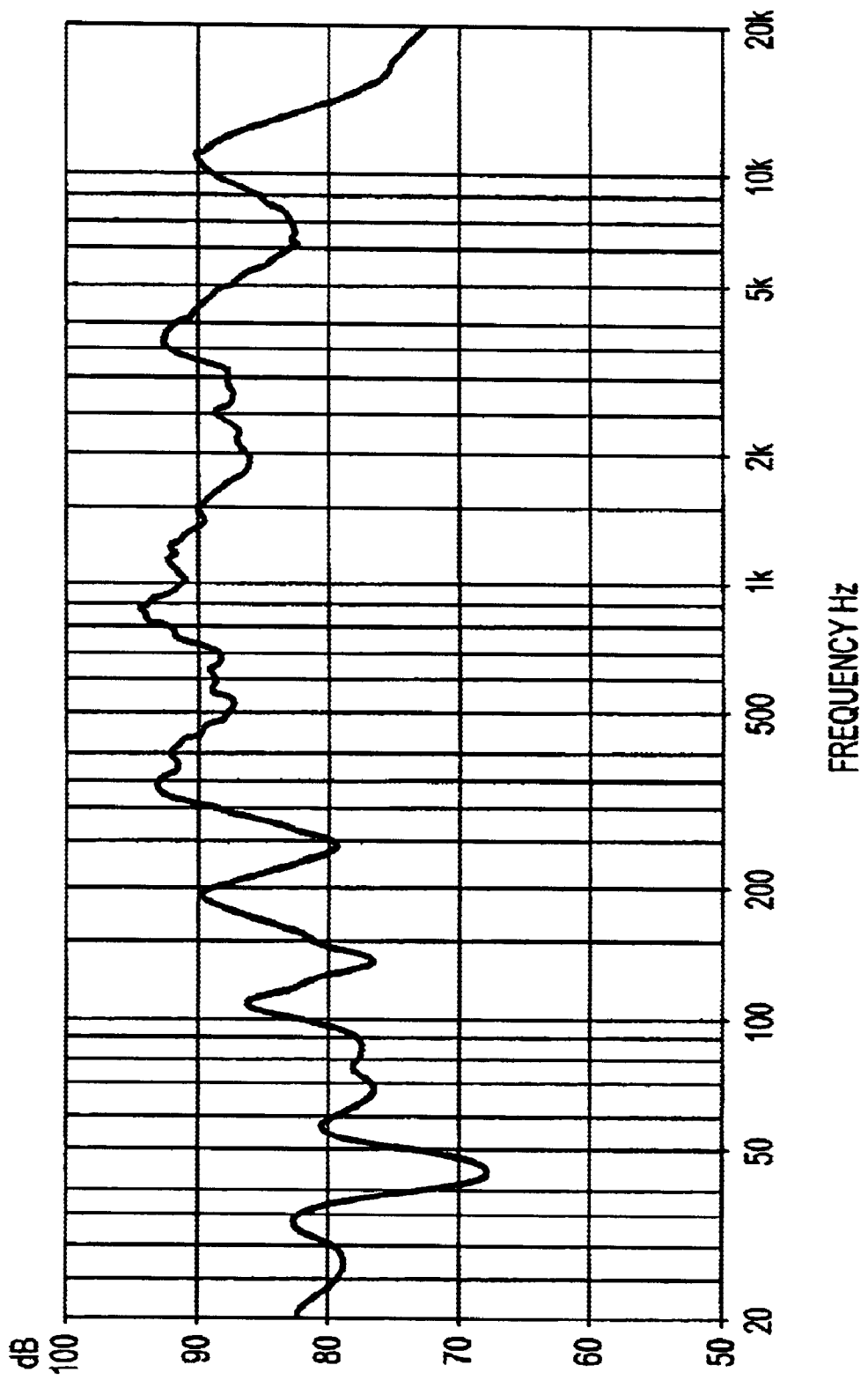
FIG. 3 is a graph of the frequency response curve of a trim panel made in accordance with FIGS. 1 and 2.

FIG. 3 is a graph of frequency response, spatially averaged, of the trim panel of FIGS. 1 and 2, which is made from a glass reinforced resin skinned composite with a low loss cellular polymer core, overall 3.5 mm thick, and which was thermoformed to the required contour.

Figure 4:
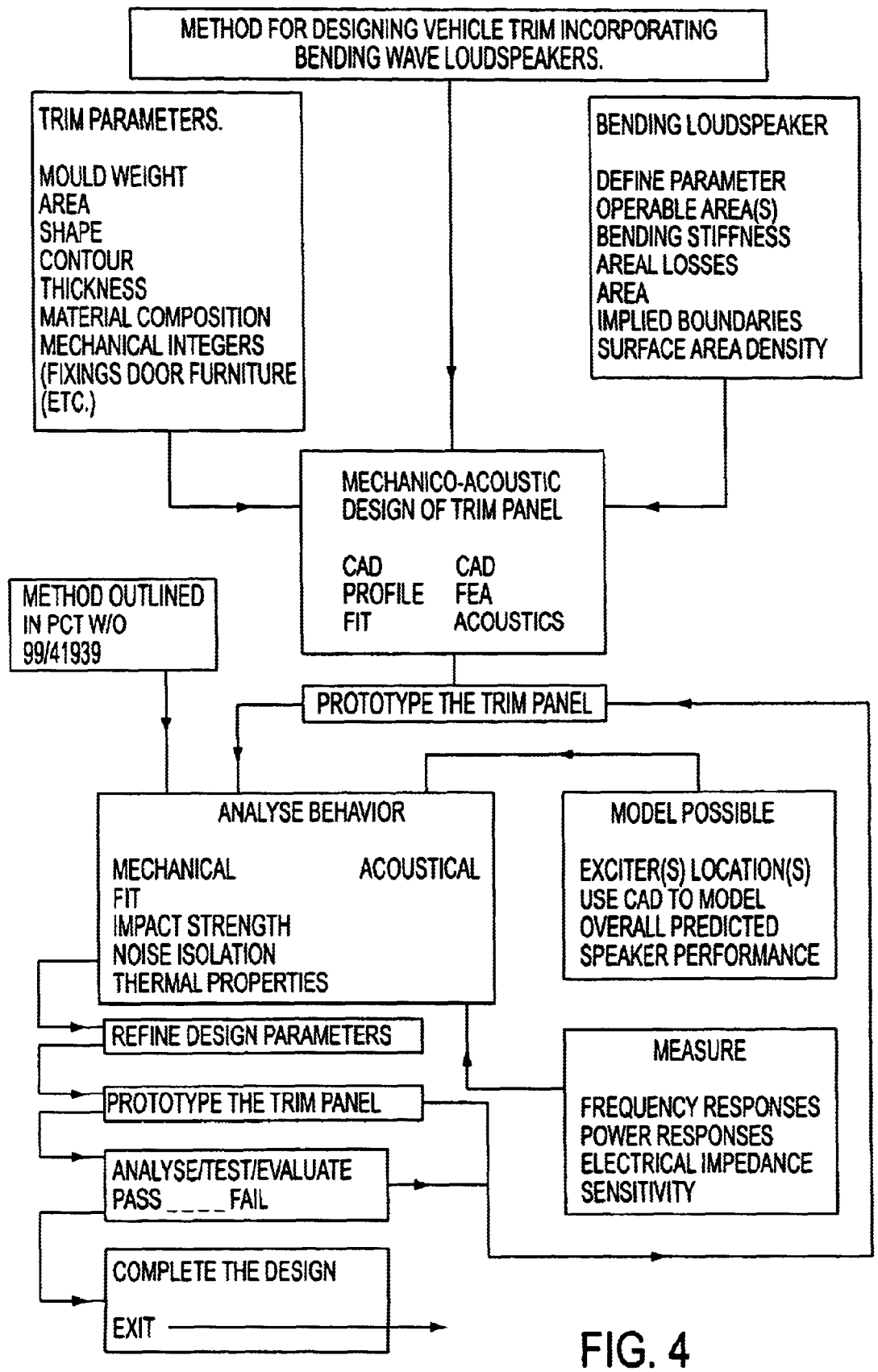
FIG. 4 is a flow diagram of the method by which the trim panel of FIGS. 1 and 2 was designed.

For the design of a structure which supports the functions of both vehicle trim and those of a bending wave loudspeaker a number of aspects need to be taken into account. This is best understood as from an exemplary flow chart which is shown in FIG. 4.

Under the heading Mechanico-Acoustic Design, computer aided, i.e. CAD, methods may be used to configure the two aspects of the design, the structural properties and form of the trim object, and the potential acoustic characteristics of the loudspeaker part which should be considered, and even integrated into the design process at an early stage if good results are to be obtained.

Trim parameters include the physical details, size, surface area thickness, contour, material content, interface with controls and facilities e.g. window and door opening fixtures, perimeter and area fixing. On the acoustical side aspects of bending wave viable local areas are considered including surface area, surface area density, implied boundary conditions, bending losses and their variation with area and frequency, consideration of location of operable areas with respect to position of trim in the vehicle for good acoustic coupling to users or occupants, plus specifics such as bending stiffness.

While the two aspects begin from different starting points perhaps with a measure of individual modelling and computer aided design, the point is reached where an integration of the design process allows for a mutual optimisation of trim and loudspeaker parameters to be aimed for combining the parameters, suitably weighted by the designers, in respect of cost and target performance.

At this point the designer can prototype the moulded trim component, and then move on to an analysis stage based on the process described in WO99/41939, which is incorporated herein by reference in its entirety. The analysis may also include laser scanning of the prototype. This analysis process can include additional modelling to predict/identify suitable locations for exciter(s) based on the modal resonance data derived using the mechanical analysis techniques noted, including that for mechanical impedance, as described in WO99/41939.

Basic mechanical properties are to be checked to verify the accuracy of the design. Likewise exciters may be placed experimentally in the predetermined locations on the operable areas and the acoustic performance of the trim prototype assessed.

From all this data the design can then be refined and a further prototype made. An evaluation stage follows which may conveniently have criteria for acceptance or rejection. If the design is "failed" at this point it may of course be revised and prototyped again, as many times as is considered necessary to complete the method. The point of entry to a new sample can either be at the earlier or at the later stage of the process according to the type and degree of revision which may be required for the trim loudspeaker.

Suitable crossover networks and filters, active and passive, well known to those skilled in the art, may be used to combine and shape the audio signals to achieve the desired acoustic result, preferably taking into account the transfer function of the acoustic space within a vehicle. The natural frequency response normally expected for a speaker used in free field must be adapted to vehicle characteristics if satisfactory results are to be obtained.

The invention is particularly useful because it opens the door to the highly cost effective integration of the loudspeaker with the vehicle trim component. Conventionally holes need to be cut in the trim, a separate loudspeaker(s) needs to be installed and their delicate pistonic diaphragms covered and protected by a grille or similar item.

An integrated component will save installation cost, may have integrated or embedded wiring, offer superior sound distribution within the vehicle, be wholly concealed, may aid vehicle interior styling and be of reduced weight, so improving fuel economy.

A key aspect is the choice of materials and structure and overall design for the trim component which reasonably maintains or even improves the present mechanical and acoustic properties but which also incorporates properties which adapt/augment its use as a satisfactory loudspeaker when driven by a suitable electromechanical exciter. While existing trim may be used effectively where good drive power is available and cost is not a significant consideration, for lower cost situations, the better optimisation of trim panel properties has important benefits.

Moreover the design/specification may also be combined with manufacturing technologies preferred for trim, including hot pressed/cured and moulded thermoset and thermoplastic composites and laminates. Examples include a material sold under the trade name 'Woodstock', being a fibre-reinforced thermoset, various thermoplastic polymers such as polypropylene which may be fibre loaded, and/or reinforced with glass fibre or similar fibre mat surfaces.

To move towards a more cost effective and efficient loudspeaker, the general objective is to specify and engineer a reduction in the panel mass and to choose a lower mechanical impedance in accordance with DM objectives. Thus for a given available force from the exciter higher vibrational and diaphragm action is obtained with greater efficiency and acoustic output.

Typical higher mass trim may have u values in the range 2 to 5 kg per square metre while certain lower mass types may already be more suitable for speaker use. For mechanical impedance trim may have values in the range 25 to 50 units. Reduction in these two values is proportionately beneficial individually or in combination.

Newer technologies for mouldable/formable trim panels using lighter composites may provide useful values in the range approximately 0.3 to 1.5 kg per square metre with Zm in the range approximately 4 to 20. These technologies may include composites with skins or thermosets or thermoplastic, e.g. polyester or polycarbonate, reinforced e.g. with glass or carbon fibre, or phenolic-based plastics on a lighter weight core of structural foam or cellular construction in metal foil, plastics or equivalent materials. Also, self-skinning foam core mouldable and injected moulded plastics are suitable to create lighter cored composites for vehicle trim structures.

A further benefit will result if/as/when the requirements, specifications for the mechanical and acoustic performance of the trim panel, e.g. noise isolation, vibration resistance at vehicle noise frequencies, thermal insulation impact resistance, etc. are incorporated in the total design process where the advanced knowledge and speaker directed analytical techniques may be used to optimise these other aspects in an overall combination of superior utility.

It will thus be understood that vehicle interior trim panels can be integrated with resonant panel loudspeakers in various applications including door trim, seat back trim, automobile dashboard trim, automobile rear parcel shelf trim, and applied to window trim and certain ceiling trim, e.g. in an aircraft or railway carriage or the like.

What is claimed is:

1. A method of making a vehicle interior trim panel having at least one integral resonant bending wave loudspeaker panel, comprising the steps of:

designing the trim panel to comprise at least one panel area capable of and intended to operate as a resonant bending wave loudspeaker;

making a prototype trim panel to the design;

optimising at least one parameter of the prototype panel as concerns its behaviour as a resonant bending wave loudspeaker by obtaining the standard deviation, as frequency is varied, of the mechanical impedance of the panel as a function of the at least on e parameter;

selecting at least one value of said at least one parameter that result(s) in a minimum of said standard deviation of the mechanical impedance of the panel; and making a trim panel in which the at least one parameter to be optimised has the selected value or values.

2. A method according to claim 1, wherein the at least one panel area of the trim panel is designed as a distributed mode loudspeaker.

3. A method according to claim 2, wherein the at least one panel area of the trim panel is designed to have an effective frequency distribution of at least the first few resonant modes of bending wave behaviour.

4. A method according to claim 3, comprising designing the at least one panel area so that resonant modes associated with one axis of the said at least one panel area are interleaved in frequency with resonant modes associated with another axis of the said at least one panel area.

5. A method according to claim 4, comprising designing the at least one panel area to comprise means defining a boundary of the said at least one panel area.

6. A method according to claim 5, comprising designing the trim panel to have at least one larger panel area comprising the said at least one panel area operable as a low frequency loudspeaker.

7. A method according to claim 4, comprising designing the said at least one panel area to have reduced mass and lower mechanical impedance compared to other regions of the trim panel.

8. A method according to claim 4, comprising integrally fixing a sub-panel to the said at least one panel area.

9. A method according to claim 1, wherein the trim panel is made by moulding using heat and/or pressure.

10. A method according to claim 4, comprising analysing the prototype trim panel using laser scanning.

11. A method according to claim 1, comprising designing the at least one panel area to comprise means defining a boundary of the said at least one panel area.

12. A method according to claim 1, comprising designing the trim panel to have at least one larger panel area comprising the said at least one panel area operable as a low frequency loudspeaker.

13. A method according to claim 1, comprising designing the said at least one panel area to have reduced mass and lower mechanical impedance compared to other regions of the trim panel.

14. A method according to claim 1, comprising integrally fixing a sub-panel to the said at least one panel area.

15. A method according to claim 1, comprising analysing the prototype trim panel using laser scanning.

* * * * *